United States Patent [19]
Edgar et al.

[11] Patent Number: 5,745,143
[45] Date of Patent: Apr. 28, 1998

[54] FLUORESCENT REFERENCE TRACKS FOR AN IMAGE SCANNING SYSTEM

[75] Inventors: Albert D. Edgar, Austin; Steven C. Penn, Georgetown, both of Tex.

[73] Assignee: International Business Corporation, Armonk, N.Y.

[21] Appl. No.: 346,709

[22] Filed: Nov. 30, 1994

[51] Int. Cl.⁶ .................. B41J 2/385; B41J 2/435; G11B 7/08; G01D 15/34
[52] U.S. Cl. .................. 347/139; 347/248; 347/256; 347/258; 347/259
[58] Field of Search .................. 347/139, 248, 347/256, 258, 259; 355/40, 41, 71, 68; 354/62; 359/851; 358/474, 475; 362/301

[56] References Cited

U.S. PATENT DOCUMENTS

5,015,070  5/1991  Montgomery et al. .................. 359/851

*Primary Examiner*—Benjamin R. Fuller
*Assistant Examiner*—L. Anderson
*Attorney, Agent, or Firm*—Jeffrey S. LaBaw

[57] ABSTRACT

Fluorescent reference tracks for use in correcting for geometric and other distortions in an image scanning system comprising a rotatable cylindrical drum assembly and an optical subsystem disposed within a protective housing is disclosed. Fluorescent reference tracks illuminable by light outside the visible spectrum, such as ultraviolet (UV) light, are disposed on inner surfaces of inwardly directed film support shoulders of the drum assembly. Respective edges of film containing an image to be scanned are retained on the outer surfaces of the film support shoulders of the drum assembly. As the film is rotated by the drum assembly past a primary light source disposed adjacent one side of the drum, light from the primary light source is directed through the film and is focused by a lens assembly disposed internal to the drum assembly onto a sensor assembly disposed at an opposite side of the drum assembly, which scans the transilluminated film portion. Simultaneously, UV light from secondary light sources is directed toward the respective inner surfaces of the portion of the support shoulders supporting the transilluminated film portion, such that a fluorescing image of the reference tracks flanking the film portion is reflected back through the lens assembly and scanned by the sensor assembly simultaneously with the film image portion.

22 Claims, 7 Drawing Sheets

FLUORESCENT REFERENCE TRACKS FOR AN IMAGE SCANNING SYSTEM

CROSS-REFERENCE TO RELATED APPLICATIONS

This application is related to commonly assigned U.S. Pat. No. 5,608,538, entitled "SCAN LINE QUEUING FOR HIGH PERFORMANCE IMAGE CORRECTION," issued Mar. 4, 1997, and U.S. Pat. No. 5,572,339, entitled "FILM SCANNING SYSTEM AND METHOD," filed on issued Nov. 5, 1996, both incorporated herein by reference as if reproduced in their entireties.

TECHNICAL FIELD

The invention relates generally to image scanners and, more specifically, to reference tracks for use in processing image data procured using a low precision image scanner to correct the image data for geometric and other distortions induced therein.

BACKGROUND OF THE INVENTION

In the photographic arts, as computer technology has become more widely available, it has become possible to scan electronically an image stored on a film and thereby convert it to a digitized electronic image to be stored in a computer system. Thereafter, the stored digitized image may be archived, edited, enhanced or otherwise digitally processed using known techniques.

High resolution scanners employ an array of sensors arranged in a line perpendicular to which a substrate containing an image is mechanically moved. The human eye can detect jitter of less than a quarter of a pixel, requiring, with a two thousand element array on 35 mm film, mechanical accuracy of approximately 5 wavelengths of light. To achieve such accuracy, current state-of-the-art scanners rely on high precision registration and handling of the substrate, such as film, containing the image to be scanned. Naturally, such precision hardware is also quite expensive. Nonetheless, it enables high quality image data to be retrieved and digitized.

It is desirable to produce a low-cost image scanner for personal use in business, home and school. One obvious way to reduce the cost of a personal scanner would be to replace the expensive image handling hardware with less expensive, low precision hardware. However, low precision hardware will result in a scanned image which has various geometric distortions caused by variations in speed of the motor and vibrations and irregularities of the transport used to move the substrate past the sensor array. Other errors may result from shifting of the substrate within the hardware. Thus, in a scanner of this type, Applicant has found it to be necessary for a number of modifications and corrections to be made to reduce the raw image data to a normalized form consistent with a high quality image.

A method and apparatus for performing such modification and correction of raw image data are described in detail in the aforementioned related copending U.S. Pat. No. 5,608, 538, entitled "SCAN LINE QUEUING FOR HIGH PERFORMANCE IMAGE CORRECTION." The scanning process disclosed in that application is critically dependent on the accurate knowledge of the position of a scan line in both the horizontal and vertical directions to compensate for errors introduced by the inexpensive transport mechanism. Although there are several possible ways to obtain the position information, a preferred method is to use two reference tracks flanking the image and within the area scanned by the sensor array. Typically, because the reference tracks must be placed in an area along the film normally occupied by sprocket holes, they cannot be transilluminated with the film.

Accordingly, in the above-described scanner, the reference tracks are made of a reflective material adhered to the underside (i.e. the side opposite the light source used to transilluminate the film) of flanges used to support the film as it is being scanned. Individual light sources are directed at the reference tracks, which reflect the light such that an image thereof is reflected to and detected by the sensor array along with the image contained on the film and transmitted via the light from the main light source.

Because the reference tracks are positioned such that they are held in register with and are scanned simultaneously with the image, they undergo the same geometric distortions as the image. Moreover, because the reference tracks are "known," they can be corrected for induced geometric distortions. By processing the image with identical corrections, the image data may also be corrected for geometric distortions.

In a film scanning system such as the type described above, or any transparent media movement system in which the illumination of the film containing an image being scanned is from one side of the film, and reflective positioning marks, or "reference tracks," are being illuminated from the other side, several potential problems will exist. Such problems are exacerbated in cases in which the location of the reference tracks must be in close proximity to the film itself; for example, where the receptor of the projected image (i.e. the linear sensor array) is also the receptor of the image of the tracks. Conventional techniques employing light within the visible spectrum can be used to illuminate the reference tracks, but great care and precision must be used to prevent spill-over of light directed toward the reference tracks onto the film. Such spillover will interfere with, and perhaps destroy, that portion of the image. The damage to the image is not correctable. For example, specks of dust on the film will return reflected light as white points appearing over a dark film, while such dust specks would appear dark by the desired transmitted light. Accordingly, it is difficult adequately to illuminate the reference tracks without disturbing the light transilluminating the film. This requires careful control of the angle and the extent of the reference track illumination and/or limited illumination levels with respect to the light used to transilluminate the film, resulting in added complexity and expense of the system in terms of precision components and/or extensive logic to interpret the dimly illuminated tracks. A related problem is that it is extremely difficult to insure that the reference tracks and only the reference tracks are reflective, as dust and other particulate matter may often appear on the tracks, thereby distorting the reflected image of the tracks themselves. Furthermore, any other contaminants on the tracks may reflect light, interfering with the recognition of the timing tracks. A further problem exists with respect to the angle of illumination. Specular reflections from the tracks can interfere if the tracks are not perfectly smooth. For example, if the tracks are etched, the edge of details will reflect specular light in ways that distort the visual position of the edges.

Therefore, what is needed is a film scanning system in which reference tracks used in correcting geometric distortion of an image being scanned are illuminated in such a way as to reduce the danger of potentially destroying any portion of the image accompanying the reference tracks, and further are illuminated in such a way as to increase the accuracy of reading the reference tracks.

SUMMARY OF THE INVENTION

The foregoing problems are solved and a technical advance is achieved by method and apparatus for employing fluorescent reference tracks for a low cost image scanner. In a departure from the art, reference tracks used in correcting for geometric and other distortions in an image being scanned are fabricated of a material that fluoresces under light outside the visible spectrum, such as ultraviolet (UV) or infrared (IR) light. In this manner, the above-described problems introduced by the spillover onto the film image of light used to illuminate the reference tracks are avoided, as light other than visible light that reflects off of the film can be filtered out before reaching the sensor so that it will not interfere with light from a primary light source used to transilluminate the film. Furthermore, such light reflecting from nonfluorescing contaminants on the reference tracks or specularly reflecting from surface irregularities in the timing tracks can be similarly filtered before reaching and being detected by the sensor.

In a preferred embodiment, the invention is implemented in a film scanner in which is disposed a mechanical transport system including a drum assembly that is rotatable about a shaft through the center thereof by a drive motor connected to the drum assembly in a conventional manner via a drive belt. The drum assembly comprises right and left disk portions, each of which include inwardly directed film support shoulders, or flanges, disposed on the inner surfaces of the disks proximate the outer peripheries thereof. Reference tracks for use in measuring and correcting for geometric distortions in a scanned image are disposed on the inner surfaces, of the support shoulders i.e., the surfaces directed toward the drum assembly shaft. In accordance with a feature of the present invention, the reference tracks are fabricated of a material such that the pattern fluoresces in the presence of UV light.

The film scanner also includes an optical subsystem comprising a primary light source for transilluminating the film, a lens assembly incorporating a UV blocking filter, a sensor assembly and two secondary light sources comprising UV light sources for illuminating the reference tracks. The sensor assembly is disposed adjacent one outer side of the drum and comprises a linear array scanning transducer. The primary light source is located adjacent an opposing outer side of the drum such that it is substantially diametrically opposed to the sensor assembly. The lens assembly is disposed internal to the drum assembly, i.e. between the disks, between the light source and the scanner assembly. Each of the UV light sources is also disposed internal to the drum assembly between the lens assembly and the primary light source and is positioned so as to be capable of illuminating the inner surface of the respective support shoulder portion opposite the primary light source.

In operation, as the film being carried on the outer circumference of the rotating drum assembly is rotated past the primary light source in a direction perpendicular to line defined by said linear array, light from the primary light source is directed through the film and the lens assembly to be detected by the sensor assembly, at which point the image contained on the portion of the film being transilluminated by the primary light source is scanned. At the same time, UV light from the UV light sources is directed toward the inner surfaces of the portion of the support shoulders supporting the edges of the film portion being scanned, such that the reference tracks flanking the film portion are caused to fluoresce. In this manner, the fluorescing image of the reference tracks will be reflected back through the lens assembly and scanned by the sensor assembly simultaneously with the associated film image portion, while directly reflecting UV light will be absorbed by the UV blocking filter incorporated into the lens assembly.

A technical advantage achieved with the invention is that the light used to illuminate the reference tracks need not be precisely directed to prevent destruction of the image normally associated with spillover.

Another technical advantage achieved with the invention is that there need not be a high contrast between the colors and/or luminosity of the material comprising the reference tracks and the base material. So long as only one of the two fluoresces, the effective contrast ratio approaches infinity, thereby reducing interference from surface contaminants in the tracks.

DESCRIPTION OF THE ILLUSTRATIVE EMBODIMENTS

Figure 1:
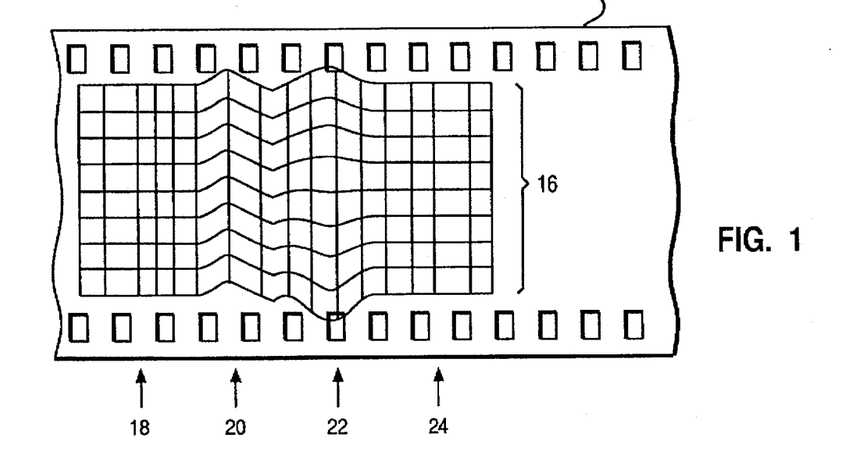
FIG. 1 illustrates several common types of mechanically induced errors that can occur in a scanned image using a linear sensor array.

Referring to FIG. 1, a film 10 or other substrate containing an image to be scanned is moved relative to a linear sensor array (not shown), comprising a plurality of linearly disposed individual sensors, in a direction perpendicular to the line defined by the individual sensors, such that when the film 10 is illuminated by a light source (not shown) as the sensor array, the image stored on the film is detected by the sensor array. The image received by the sensor array has a number of errors which are induced by deficiencies in the mechanical transport system. These errors are illustrated in FIG. 1 by an imaginary grid pattern 16 superimposed on the film 10. For ease of illustration, the film 10 itself is not depicted as having the same errors; rather, the grid pattern 16 represents how array pixels of the image would map back to the fixed film 10, as though the sensor array were writing the grid pattern 16 onto the film 10. If the film had a perfect grid pattern image, then the image of this pattern in memory after scanning would have the complementary distortions.

As the individual sensors are fixed in the silicon of the sensor array, some of the classical distortions, such as barrel distortion causing curved vertical lines, will not occur; however, the distortions which are possible include a variation in horizontal magnification, designated by reference numeral 20, resulting from speed jitter; a vertical waviness, designated by reference numeral 22, resulting from the lateral jitter of the sensor array or the film 10; a complementary vertical waviness, designated by reference numeral 24, caused by optical magnification variations due to change of focus of an imaging lens of the scanner or movement of the film 10 toward and away from an imaging lens (not shown) during a scan; and a slanting of vertical lines, or twist jitter, designated by reference numeral 26, caused by a twisting of the sensor array.

Figure 2A:
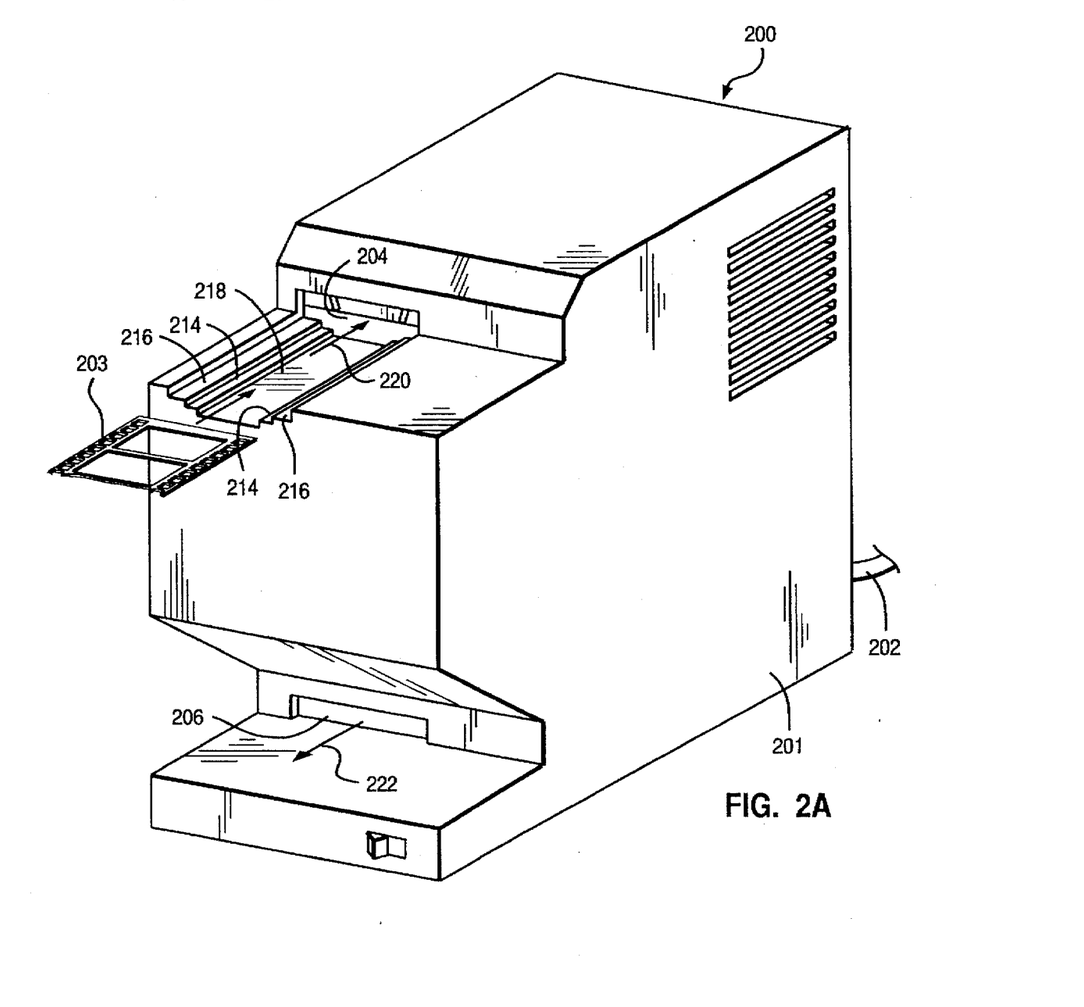
FIG. 2a is a perspective view of a film scanning system embodying features of the present invention.
Figure 2B:
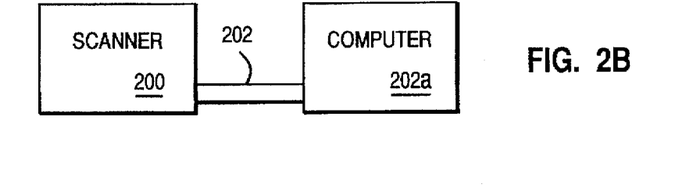
FIG. 2b is a block diagram of the film scanning system of FIG. 2a connected to a computer for processing image data retrieved using the film scanning system.

Referring to FIGS. 2a and 2b, a scanner 200 comprising a protective housing 201 (FIG. 2a) may be electrically connected via a cable 202 to a computer 202a (FIG. 2b) for processing image data captured using the scanner 200. As will be shown and described in greater detail with reference to FIGS. 3–5, inside the housing 201 (FIG. 2a) are various electrical, mechanical and optical subsystems of the scanner 200. Referring to FIG. 2a, a strip of film 203 may be introduced into the scanner 200 via an entry aperture 204 and, after the film is scanned, is expelled from the scanner 200 via an exit aperture 206. At this point, it should be noted that the term "film," as used herein, is defined to include any media containing an image to be scanned, such as slides, transparencies and may, with modifications to the light sources, include reflection media such as prints.

The housing 201 preferably includes a film guide area 212, which includes two pairs of guide shoulders, respectively designated by reference numerals 214, 216, and a guide surface 218, all of which lie in respective parallel planes. The purpose of the pairs of shoulders 214, 216, and the guide surface 218 is to accommodate media of differing widths, such as filmstrips and mounted slides, allowing each to ride on the edges without contacting the image area, and to ensure that the film 203 is introduced into the entry aperture 204 in a manner such that it is received by the internal transport mechanism (FIG. 3) in proper registry and orientation.

In operation, the film 203 is introduced into the guide area 210 such that it is parallel to the guide surface 218 and rests either upon the guide surface 218 or upon the appropriate guide shoulder pairs 214 or 216 depending on the width of the film 203. An operator will then manually urge the film 203 in the direction indicated by an arrow 220, using the guide surface 218 or shoulder pairs 214, 216 to maintain proper orientation of the film 203 along the axis of the arrow 220, until the film 203 is inserted sufficiently into the aperture 204 so as to contact a drum assembly (FIG. 3) disposed within the housing 201.

At this point, the drum assembly will grasp the film 203, drawing it further within the aperture 204 until at least a portion of the film lies completely within the housing 201. Upon engagement of the film 203 by the drum assembly, the operator may release the film 203, as the translation and scanning operation are thereafter automatic and occur internal to the scanner 200. The film 203 is transported by the drum assembly about a semicircular path, during which it is scanned by an optical subsystem (FIG. 3), also disposed within the housing 201. After the scan is completed, the operator may remove the scanned film 203 from the scanner 200, via the aperture 210, by drawing it in the direction indicated by an arrow 222.

Figure 3:
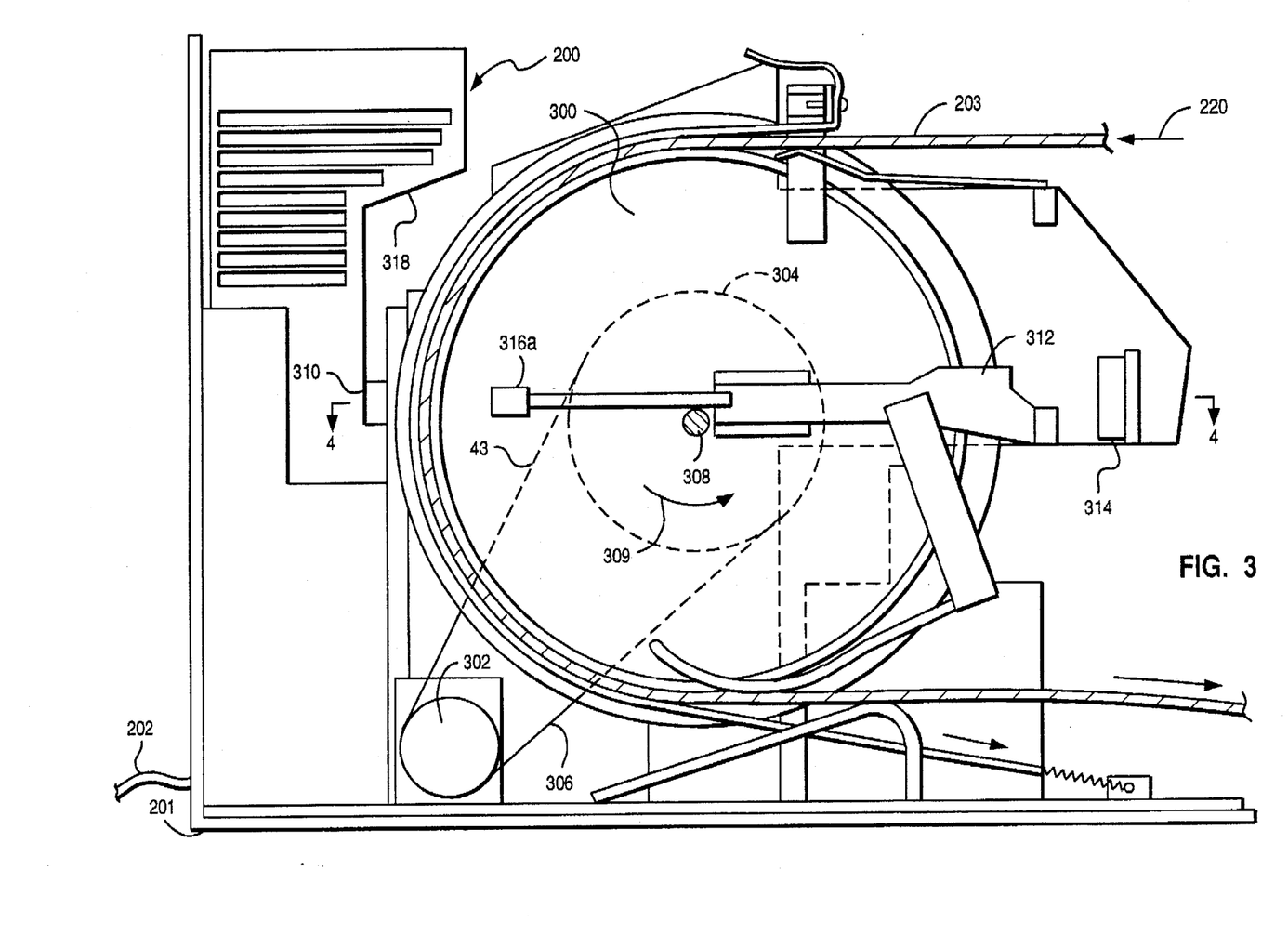
FIG. 3 is a side elevational view of the film scanning system of FIG. 2a with a portion of the housing removed to expose a drum assembly and an optical subsystem thereof.

Referring to to FIG. 3, disposed within the protective housing 201 of the scanner 200 is a mechanical transport system comprising a drum assembly 300 and a drive motor 302 connected to a drum drive wheel 304 of the drum assembly 300 via a drive belt 306. The drive belt 306 is disposed about said drum drive wheel 304 such that the drum assembly 300 may be caused to rotate about a shaft 308 through the center of the drum assembly 300 and drum drive wheel 304 in the direction indicated by an arrow 309. Also disposed within the protective housing 201 of the scanner 200 is an optical subsystem comprising a primary light source 310, a lens assembly 312, a sensor assembly 314, two secondary light sources 316a, 316b (only one of which can be seen in FIG. 3) and a power supply 318. In a preferred embodiment, the sensor assembly 314 comprises a CCD linear array, such Toshiba part number TCD1300D, or a tricolor array, such as Toshiba part number TCD2310C, and appropriate scanner control circuitry, although it should be understood that any number of different CCD/circuitry arrangements that could be used to implement the sensor assembly 314.

Figure 4:
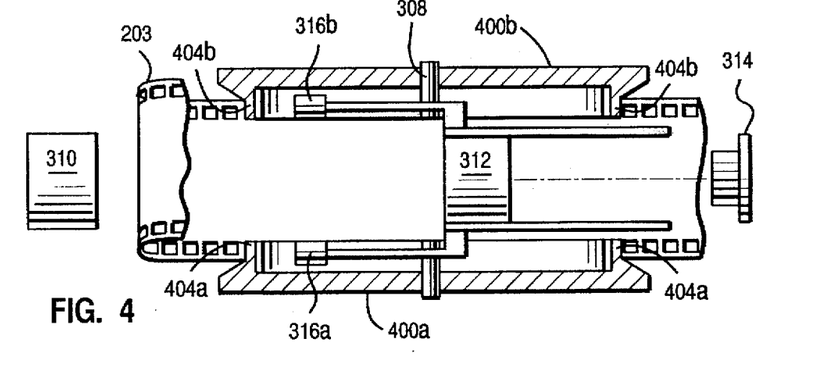
FIG. 4 is a top elevational view, partly in section, of a portion of the film scanning system of FIG. 2a, illustrating a portion of the drum assembly and optical subsystem thereof.

Referring now to FIG. 4, the drum assembly 300 comprises a right disk portion 400a and a left disk portion 400b supported by the shaft 308 such that the disks 400a, 400b may be caused to rotate together synchronously about the shaft 308, it being understood that, in the illustrated embodiment, the direction of such rotation would be into the page. The disks 400a, 400b, include respective support shoulders 404a, 404b, which shoulders 404a, 404b, are disposed on an inner surface of the disks 400a, 400b, proximate the outer peripheries thereof. In this manner, when the film 203 is introduced into the aperture 204 (FIG. 2a), due to the registry provided by the guide area 218 (FIG. 2a) or the guide shoulders 214 or 216 (FIG. 2a), the film will eventually be supported by the film support shoulders 404a, 404b, as shown in FIG. 4, and retained thereon appropriate retention means (not shown). As previously described, as the drum assembly 300 is caused to rotate about the shaft 308, the film 203 will continue to be drawn into the scanner 200. As the film 203 is translated by the drum assembly 300 about the axis of the shaft 308, eventually, a leading edge of the film 203 will traverse a semicircular path around the shaft 308, until the leading edge reaches the aperture 206, at which point the operator may remove the film 203 as it is expelled.

Figure 5A:
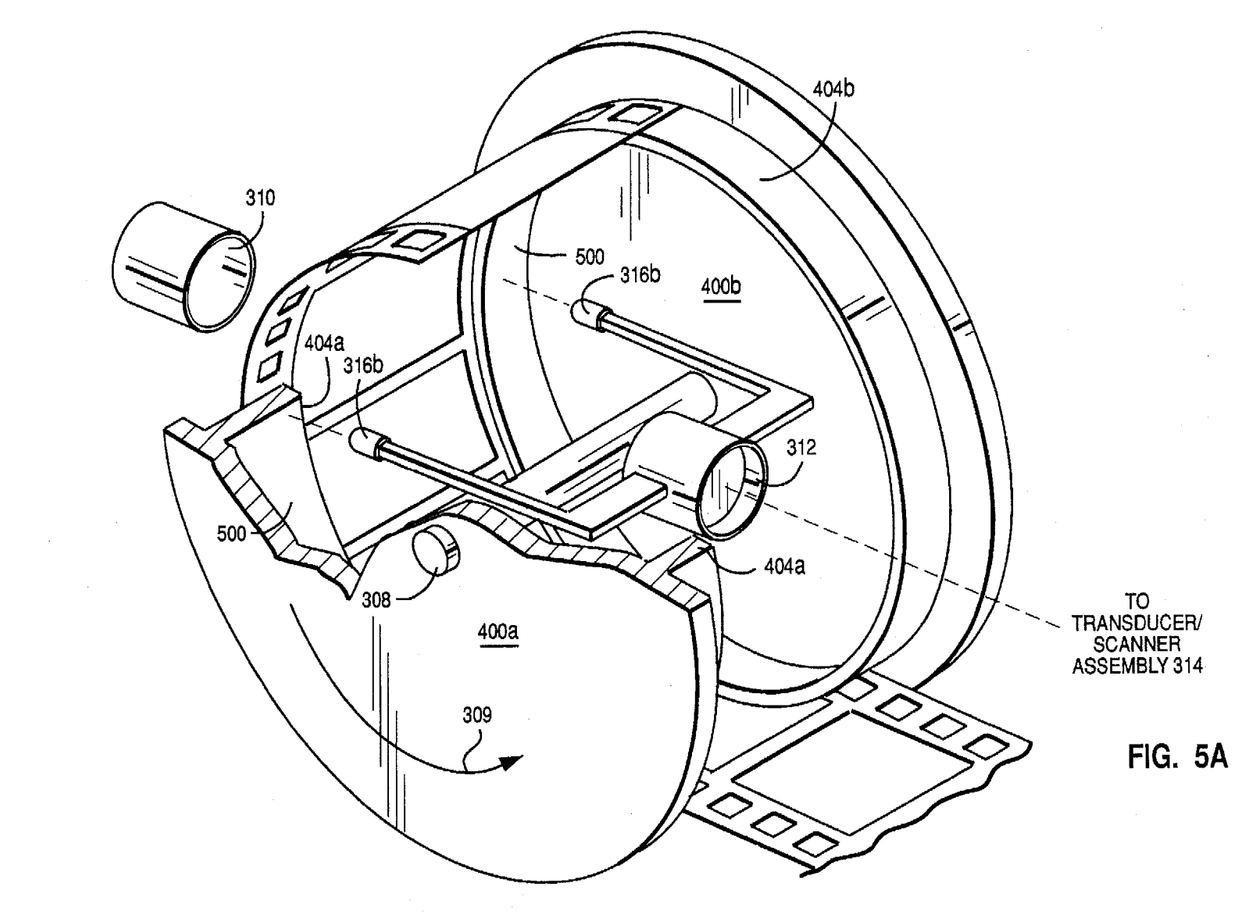
FIG. 5a is a perspective view, partly in section, of a portion of the drum assembly and optical subsystem shown in FIG. 4.
Figure 6A:
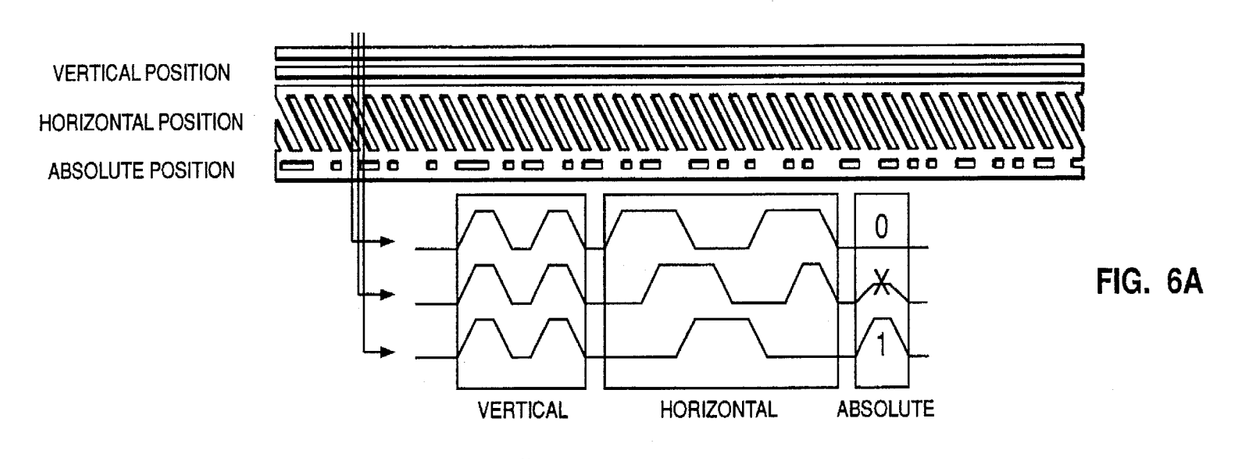
FIG. 6a is a detailed drawing of a single clock reference track embodying features of the present invention.
Figure 6B:
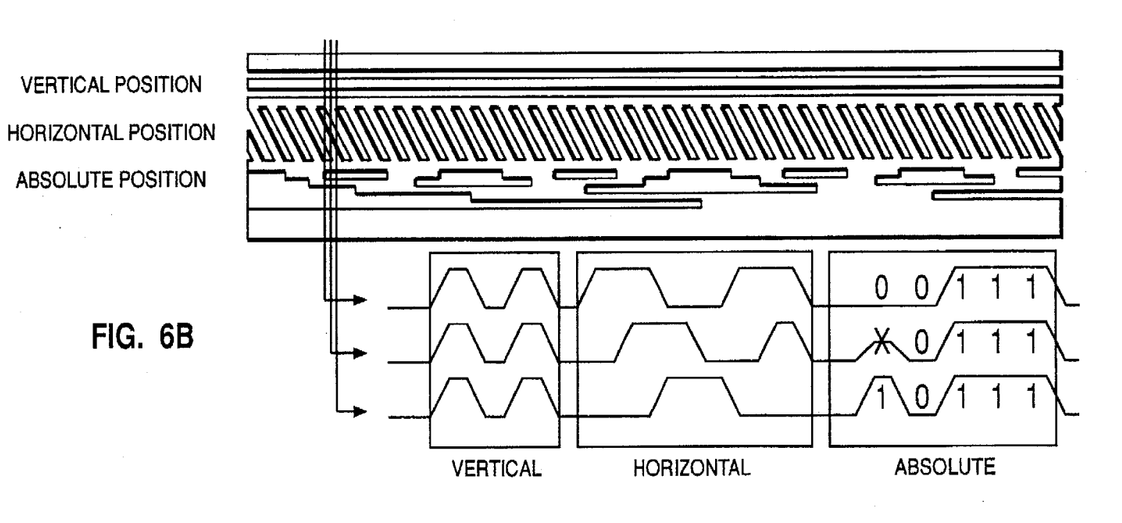
FIG. 6b is a detailed drawing of a gray code reference track embodying features of the present invention.

As shown in FIG. 5a, reference tracks 500 are disposed on the inner surfaces of the right and left shoulders 404a, 404b, of the disks 400a, 400b. FIGS. 6a and 6b respectively illustrate alternative embodiments of reference tracks that may be used in the present embodiment. Because the present invention is directed toward the fabrication and composition of such reference tracks, rather than the use thereof, the methods of using reference tracks are not described in detail herein. However, it should be noted that a number of such methods are described in detail in commonly-assigned U.S. Pat. No. 5,608,538 issued Mar. 4, 1997, which has previously been incorporated by reference in its entirety.

In accordance with a feature of the present invention, the reference tracks 500 are photoetched into a strip of base material which is adhered to the inner surfaces of the shoulders 404a, 404b and the resulting recesses are filled with a material that fluoresces when illuminated by, light outside the spectrum detectable by the sensor. Such material is available from DayGlo. In a preferred embodiment, the tracks 500 are laser etched in stainless steel foil and the etched voids are filled with material that fluoresces in ultraviolet (UV) light emitted by the secondary light sources 316a, 316b. It should be understood that, because the UV light from the light sources 316a, 316b is filtered by the lens assembly before reaching the sensor 314, the sources 316a, 316b need not be of low intensity, nor precisely directed, as any light reflected directly from the transilluminated film 203 will not be detected by the sensor 314, and hence not degrade the scan. In addition, because the UV light reflecting off the base material of the reference tracks 500 will not be detected by the sensor 314, the base material may be virtually any color and type of surface and still appear black to the sensor 314, therefore, not affecting the recognizability of the reference tracks 500.

Figure 5B:
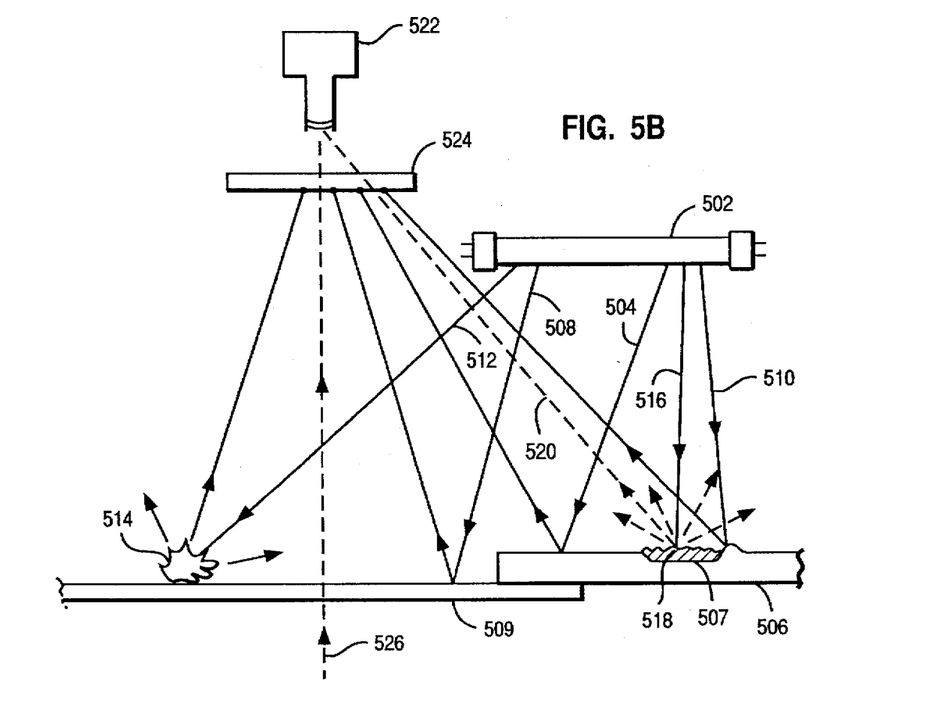
FIG. 5b illustrates the use of a UV filter in combination of the optical system shown in FIG. 4.

The filtering of extraneous artifacts will now be described with reference to FIG. 5b, in which, for ease of reference, visible rays are shown as broken lines, while UV rays are shown as solid lines. As shown in FIG. 5b, a UV light source 502 emits UV rays 504, some of which reflect specularly off material 506, in which the reference tracks 507 are etched. Similarly, other rays 508 reflect off film 509 proximate to the reference tracks. Rays 510 reflect specularly off edges in the material 506 which are tilted due to the effects of the etch or of being damaged by scratching. Rays 512 reach contaminants 514, such as dust laying on the reference track or film surface, and are reflected also. Finally, rays 516 reach fluorescent material 518 and are converted to visible rays 520 that reradiate from the material 518. Of all of the rays, only the visible rays 520 reradiating from the fluorescing material 518 bear the image of the reference tracks. All other rays bear distractions that make reading the reference tracks difficult or impossible and damage or destroy the image read from the film.

A sensor 522 could potentially be distracted by all of the reflected rays. Therefore, in accordance with a feature of the present invention, a UV absorbing filter 524 removes all rays except for the desired ones 520 reradiated from material 518 in the the reference grid 507. Note that visible light rays 526 passing through the film 509 and bearing the film image is also passed by the filter 524 and detected by the sensor 522.

Referring again to FIG. 4, light emitted from the primary light source 310 will transilluminate the portion of the film 203 directly opposite the light source 310, such that the image contained on the film portion will be focused by the lens assembly 312 onto the sensor assembly 314. At the same time, the portion of reference tracks 500 flanking the transilluminated film portion are illuminated by light, which in this case is UV light, from the respective light source 316a, 316b, such that images thereof are also reflected back through the lens and focussed on the sensor assembly 314 in register with the image. Inasmuch as the film 203 and reference tracks 500 are translated across the optical path from light sources 310, 316a, 316b, through the lens assembly 312 to the sensor assembly 314, it should be readily apparent that the light detected by the sensor assembly 314 will, over time, result in a scan of the images contained in the film 203 in register with reference track 500 images as the film 203 traverses the circumference of the drum assembly 300. It should be noted that, due to the presence of the shaft 308, the sensor assembly 314 and light sources 310, 316a, 316b, will preferably not be in a perfect diametrically opposing relationship, but only substantially so, as the shaft 308 would otherwise lie within the above-defined optical path and interfere with the image being scanned. This is not a problem because, in most optical systems imaging film, the angle viewing the edges of the film is much steeper than the small angles required by offsetting the lens in this application.

The optical path of the scanning process will now be described in further detail with reference to FIGS. 3–5. As the film 203 is transported by the drum assembly 300 around the shaft 308, the reference tracks 500, images of which are transmitted to the sensor assembly 314 in register with the image contained on the film 203, as described above, will provide a means for locating points in space and time along the longitudinal axis of the film 203 during the scanning process. Thus, as shown in greater detail in FIGS. 6a and 6b, the reference tracks may serve as timing tracks or position locators during the scanning process. The assembly 314 merely scans and recognizes these gradient marks, translates and analyzes them and thereafter correlates them to the respective scan lines. One simple example of use of such a feature is that after the scanning process, in examining the image, if it is desirable to index back to a particular location on the film 203, for example, to scan at a higher resolution, the reference tracks make this possible. A controller (not shown) controlling the operation of the drum drive motor 302 would simply generate the appropriate commands to the motor 302 to cause rotation of the drum assembly 300 so that the area of the film to be rescanned would be located appropriately in line with the light source 310, lens assembly 312 and sensor assembly 314.

Another example of use of such a feature is that after the scan process, if the drum assembly 300 wobbled or changed speed during the scan, any distortions in the scanned image would also have occurred to the scanned image of the reference tracks. By correcting the image of the reference tracks in a software resizing process within the computer 202a (FIG. 2b), the image on the film follows into precise correction.

Figure 7:
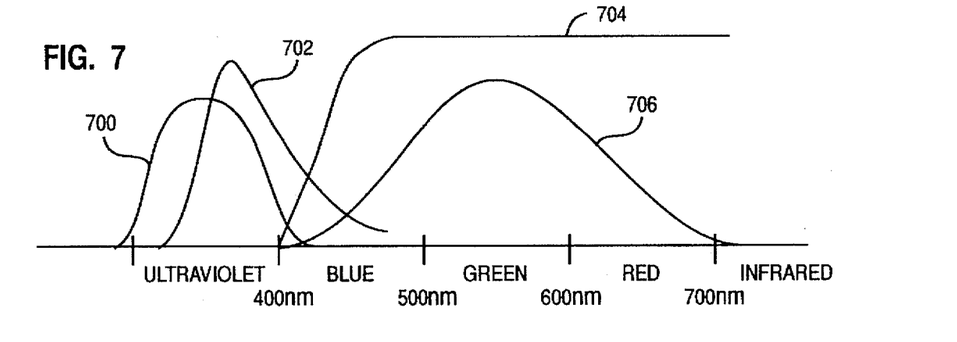
FIG. 7 illustrates the spectral positions of different radiations that can be used in implementing the present invention.

FIG. 7 illustrates spectral positions of different radiations that can be used in implementing the present invention. Referring to FIG. 7, a line 700 represents the relative transmittance of an UV transmitting filter with respect to light wavelength. A line 702 represents the relative sensitivity of fluorescing material used to create the reference tracks with respect to light wavelength. A line 704 represents the relative transmittance of a UV absorbing filter with respect to light wavelength, while a line 706 represents the sensitivity of a human eye with respect to light wavelength.

Referring again to FIGS. 3 and 4, the light sources 316a, 316b, are preferably miniature mercury discharge lamps, such as those available from Aristo. The mercury discharge may be driven by a power supply (not shown) available from the same sources that supply the bulbs. Alternatively, argon lamps, or even tungsten lamps, could be substituted. The visible mercury bands need to be filtered out by UV passing filters, such as those available from Eastman Kodak Company or Schott Glass in Germany. Alternatively, a single high intensity source of UV can launch into fiber optic cables that are positioned so the emitting ends are proximate to and illuminate the timing reference tracks. High intensity fiber optic launchers are available from most scientific supply houses such as Klinger scientific and Melles Griot. The emitting ends can also have attached lenses to guide the light more precisely to the timing reference tracks. In addition, directly reflected UV light must be filtered out in the optical assembly associated with the sensor 314. A recommended filter for this purpose is the Kodak Wratten 2E, available from Eastman Kodak Company.

There are a number of alternative ways to excite the fluorescing reference tracks. For example, Eastman Kodak Company makes a material called Irtan (Trademark of Eastman Kodak Company) that fluoresces in visible light when excited by IR. The material is precharged to raise the valence electrons to an intermediate level. The IR radiation then raises the electrons further to an unstable state that discharges completely to emit visible photons.

In an alternative embodiment of the present invention, a method of exciting the reference tracks is implemented without using light. In this method, the reference tracks are manufactured as described above by etching a conductive material and filling in the cavities with a fluorescing phosphore, such as P39 or P4, commonly used in cathode ray tube (CRT) displays. In addition, the entire track may have a thin aluminization layer deposited over the top with an antioxidant, using technology common to the manufacture of CRT phosphor screens. These phosphores are excited by electrons sprayed from a needlepoint emitters placed in very close proximity to the reference tracks, in effect, implementing a CRT without the vacuum. It is noted that, in the air, the electrons can not be aimed, because of constant collisions with air molecules, but if the conductive reference track support material is grounded, the field between the negative emitter and the reference track will urge the electrons to collide with the phosphor. Unlike in a CRT, where the electrons bear the image, in this case the diffusion by gas is not a problem, because the phosphore deposition bears the image. The use of electrons rather than light as the exciting radiation completely eliminates the problem of light spillover. Even the occasional piece of fluorescent dust that would be activated by an UV stimulation will have no damaging effect on the image when the reference tracks are stimulated by electrons.

Other methods of stimulating fluorescing reference tracks are also possible, as will be readily apparent to the skilled artisan, and may be used without departing from the spirit or the scope of the invention.

Figure 8:
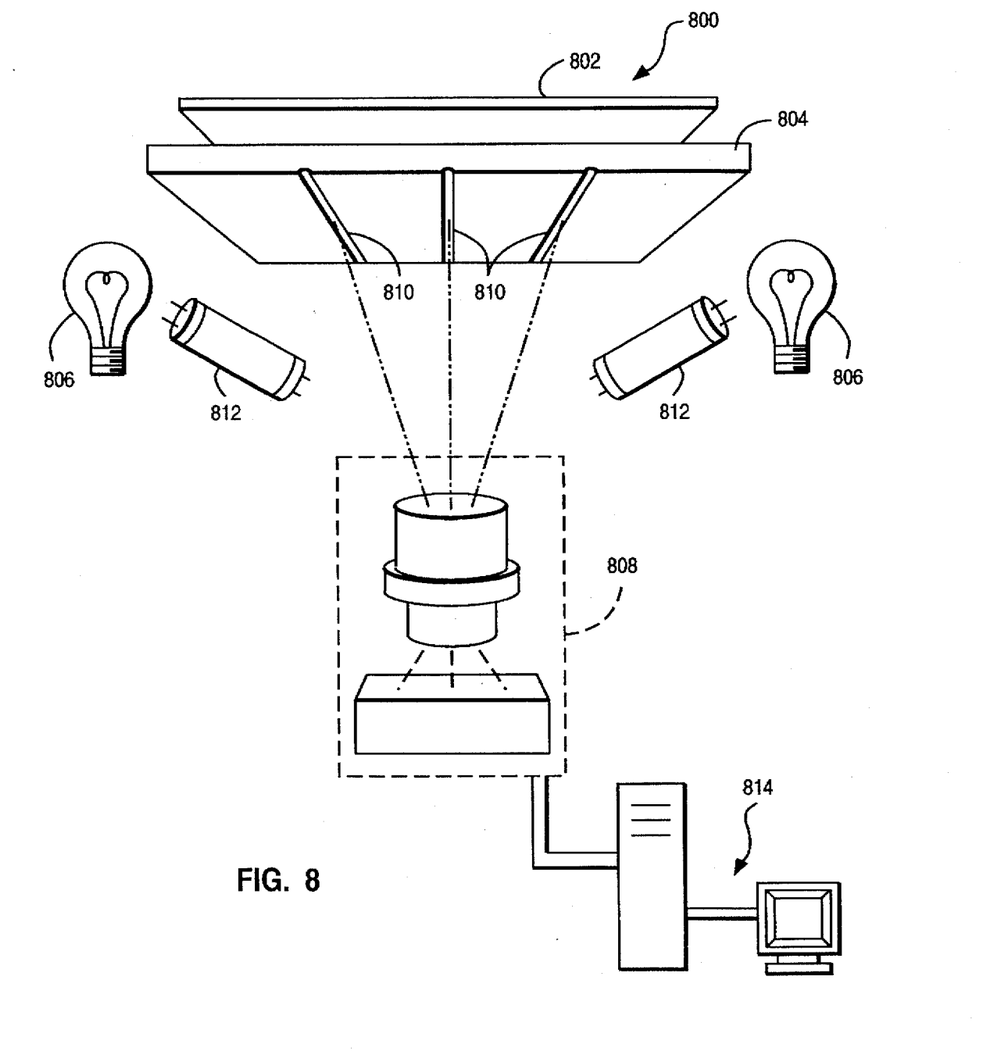
FIG. 8 is illustrates an alternative embodiment of the present invention employing fluorescing reference tracks in a flatbed scanner.

In the illustrated embodiment, the reference tracks 500 are disposed peripheral to, but not overlapping, the image area. In an alternative embodiment, reference tracks are placed coincident with the image area. Referring now to FIG. 8, a flatbed scanner 800 includes a reflective document 802 to be scanned laying on a transparent platen 804. The document is illuminated by lamps 806 and the reflected light from the document is imaged by optics and sensor assembly 808. In accordance with a feature of this alternative embodiment, the platen 804 has deposited thereon a grid pattern of a fluorescing material 810. The grid 810 is deposited in a known pattern. Any deviation from this pattern in the scanned image will quantify geometric distortions in the scanning process. The fluorescing material is deposited in very thin lines so as to minimize interference with the image of the document 802 and is ideally made of a transparent material to further avoid interference. The fluorescing material comprising the grid 810 is excited by the UV lamps 812, but not by the lamps 806. Although not shown, it should be understood that a UV filter should be placed in the platen to avoid exciting the brightener present in most paper.

During the scanning process, the lamps 806 and UV lamps 812 are alternately strobed in synchronization with the scanning process and the resulting interstitial scans separated into two images to produce two scanned images, one under UV shows primarily the fluorescent grid pattern, and the other shows primarily the document 802 as viewed under the visible light. In a manner similar to that described above, a computer 814 receives both images, determines the geometric distortions in the UV image, and applies the inverse of those distortions to the visible image. Corrections that realign the UV image will, by default, also realign the visible image, as the two are mechanically registered.

The above-described method of interposing the UV image directly over the visible image and using a temporal strobe to capture both images in alignment has applications to a flatbed document scanner.

Figure 9:
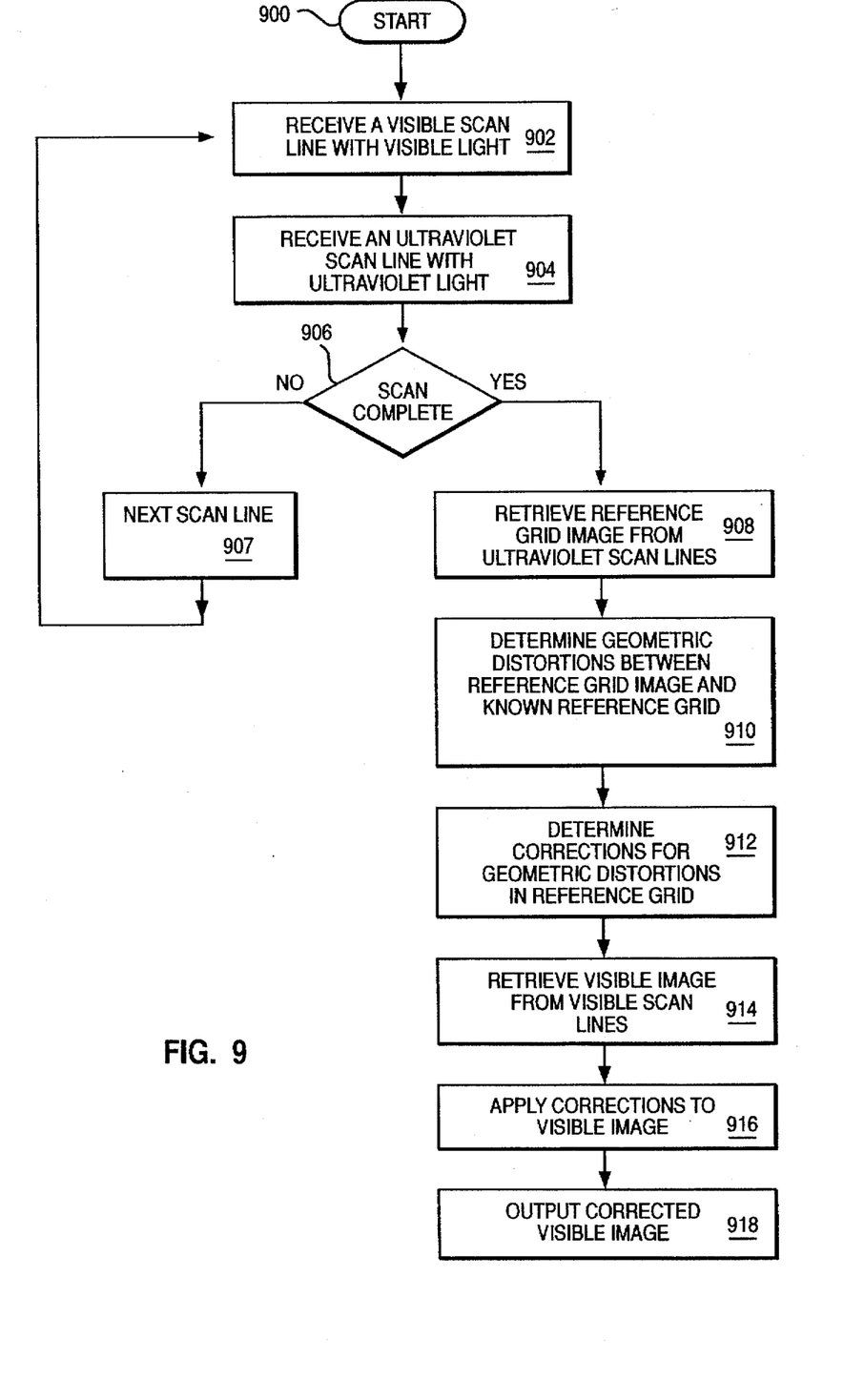
FIG. 9 is a flowchart of the method of the present invention.

FIG. 9 is a flowchart illustrating a preferred method of using the scanner 200 and associated computer 202a. The scanning process starts step 900. In step 902, the sensor 314 receives a visible scan line with visible light. In step 904, the sensor 314 receives an ultraviolet scan line with ultraviolet light. In step 906, a determination is made whether the scan is complete. If not, proceeds to step 907, in which the scanner 200 advances to the next scan line, and then returns to step 902. If in step 906 it is determined that the scan is complete, execution proceeds to step 908. In step 908, the reference grid image is retrieved from the ultraviolet scan lines. In step 910, the retrieved reference grid image is compared with a known reference grid to determine the geometric distortions that have been induced in the former. In step 912, the reference grid image is corrected for such geometric distortions. In step 914, the visible image is retrieved from the visible scan lines. In step 916, the corrections determined in step 912 are applied to the visible image. In step 918, the corrected image is output to a file or an I/O device (not shown) of the computer 202.

It is understood that the present invention can take many forms and embodiments. The embodiments shown herein are intended to illustrate rather than to limit the invention, it being appreciated that variations may be made without departing from the spirit or the scope of the invention.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A scanning device comprising:
   a sensor for capturing an image on a substrate and a reference grid in register with said image; and
   means for illuminating said reference grid with a first type of radiation, said reference grid reradiating said first type of radiation as a second type of radiation; and
   said sensor being responsive to said second type of radiation.

2. The device of claim 1 wherein the sensor is relatively insensitive to the first type of radiation in comparison to the second type of radiation.

3. The device of claim 2 wherein the sensor is rendered insensitive to said first type of radiation by including a filter blocking said first type of radiation.

4. The device of claim 2 wherein said first type of radiation comprises radiation other than visible light and said second type of radiation comprises visible light.

5. The device of claim 4 wherein said first type of radiation is ultraviolet UV radiation and said reference grid illumination means comprises at least one UV radiation source.

6. The device of claim 4 wherein said first type of radiation is infrared IR radiation and said reference grid illumination means comprises at least one IR radiation source.

7. The device of claim 1 wherein said reference grid illumination means comprises at least one electron emission source.

8. The device of claim 1 further comprising means for transilluminating said substrate with said second type of radiation.

9. The device of claim 8 wherein said substrate transillumination means is disposed on a first side of said substrate and said reference grid illumination means and said sensor are disposed on a second side of said substrate, said filter and said sensor being located so that light from said substrate transillumination means passes through said substrate on a path to said filter and said sensor.

10. The device of claim 9 further comprising means for supporting said substrate between said substrate transillumination means and said sensor.

11. The device of claim 10 wherein said substrate support means comprises a pair of flanges each having a first side for supporting opposing edges of said substrate and a second side opposite said first side on which is disposed said reference grid.

12. A system for capturing an image on a substrate and a reference grid in register with said image, the system comprising:

a primary radiation source for transilluminating said substrate with visible light;

at least one secondary radiation source for illuminating said reference grid with radiation other than visible light, said reference grid reradiating said radiation from said secondary radiation source as visible light;

a sensor located on an opposite of said substrate from said primary radiation source for detecting said visible light transilluminating said substrate and reradiated by said reference grid;

a filter located between said primary radiation source and said sensor for blocking said radiation other than visible light from reaching said sensor; and means for supporting said substrate between said primary radiation source and said sensor.

13. The system of claim 12 wherein said at least one secondary radiation source comprises an ultraviolet UV radiation source and wherein said reference grid is fabricated of a material that reradiates UV radiation as visible light.

14. The system of claim 12 wherein said at least one secondary radiation source comprises an infrared IR radiation source and wherein said reference grid is fabricated of a material that reradiates IR radiation as visible light.

15. The system of claim 12 wherein said at least one secondary radiation source comprises an electron emission source and wherein said reference grid is fabricated of a fluorescing phosphore.

16. The system of claim 12 further comprising a lens assembly for focussing said visible light transilluminating said substrate and reradiated from said reference grid on said sensor.

17. The system of claim 16 wherein said means for supporting comprises a drum assembly for transporting said substrate relative to an optical path from said primary light source to said sensor through said lens assembly.

18. A method of scanning an image on a substrate and a reference grid in register with said image, the method comprising the steps of:

translating said substrate and said reference grid relative to a sensor;

illuminating said substrate with a first type of radiation;

irradiating said reference grid with a second type of radiation, said reference grid reradiating said second type of radiation as said first type of radiation;

detecting said image and said reference grid from said first type of radiation with said sensor;

comparing said detected reference grid with a known reference grid to detect distortions induced in said detected reference grid during said translating; and processing said detected image to remove distortions induced therein during said translating.

19. The method of claim 18 wherein said first type of radiation is visible light and said second type of radiation is radiation other than visible light.

20. The method of claim 18 wherein the step of irradiating said reference grid comprises irradiating said reference grid with ultraviolet (UV) radiation.

21. The method of claim 18 wherein the step of irradiating said reference grid comprises irradiating said reference grid with infrared (IR) radiation.

22. The method of claim 18 wherein the step of irradiating said reference grid comprises irradiating said reference grid with electrons.

* * * * *

UNITED STATES PATENT AND TRADEMARK OFFICE
CERTIFICATE OF CORRECTION

PATENT NO. : 5,745,143
DATED : April 28, 1998
INVENTOR(S) : Edgar et al

It is certified that error appears in the above-identified patent and that said Letters Patent is hereby corrected as shown below:

Column 12, line 31, please delete Claim 19 and insert therefore --The method according to claim 18 further including the steps of providing a visible light as said first type of radiation and providing radiation other than visible light as said second type of radiation--.

Signed and Sealed this

Fourth Day of May, 1999

Attest:

Attesting Officer

Q. TODD DICKINSON

Acting Commissioner of Patents and Trademarks